United States Patent [19]
Kondo et al.

[11] Patent Number: 6,091,719
[45] Date of Patent: Jul. 18, 2000

[54] SYSTEM AND METHOD FOR TRANSMITTING PAGING MESSAGE

[75] Inventors: Seiji Kondo, Tokyo; Hiroshi Ishiga, Kanagawa, both of Japan

[73] Assignee: NEC Corporation, Tokyo, Japan

[21] Appl. No.: 08/908,370

[22] Filed: Aug. 7, 1997

[30] Foreign Application Priority Data

Aug. 8, 1996 [JP] Japan ................................. 8-209547

[51] Int. Cl.⁷ ............................................. H04J 3/00
[52] U.S. Cl. ................................. 370/345; 370/314
[58] Field of Search ............................ 370/336, 337, 370/347, 349, 314, 328, 345, 313; 455/31.1, 31.2, 38.1, 503, 426, 31.3; 340/825.44, 825.47, 825.5, 311.1

[56] References Cited

U.S. PATENT DOCUMENTS

| | | | |
|---|---|---|---|
| 5,146,214 | 9/1992 | Yamada et al. | 340/825.03 |
| 5,642,356 | 6/1997 | Wenk | 370/337 |
| 5,673,259 | 9/1997 | Quick, Jr. | 370/342 |
| 5,729,540 | 3/1998 | Wegrzyn | 370/336 |
| 5,918,170 | 6/1999 | Oksanen et al. | 455/343 |

*Primary Examiner*—Huy D. Vu
*Assistant Examiner*—Jasper Kwoh
*Attorney, Agent, or Firm*—Ostrolenk, Faber, Gerb & Soffen, LLP

[57] ABSTRACT

When a mobile station is to be called by a fixed terminal device as a caller side, incoming call information containing the intermittent receiving cycle of the mobile station and a mobile station number is sent from a control station to a radio base station. A paging slot received by the mobile station is obtained based the mobile station number and the intermittent receiving cycle. The incoming call information is written in a buffer corresponding to the obtained paging slot in a paging slot table section. A transmission processing section calculates products between intermittent receiving cycles and numbers of holding times. A priority order for transmission is decided based on the calculated products. The mobile station numbers are packed in a paging message starting from the information high in the priority order.

15 Claims, 5 Drawing Sheets

SYSTEM AND METHOD FOR TRANSMITTING PAGING MESSAGE

BACKGROUND OF THE INVENTION

The present invention relates to a system and a method for transmitting a paging message for an incoming call, and more particularly to a transmission system and a transmission method for mobile stations having intermittent receiving cycles different from each other.

As a paging message call transmission system, a mobile communication cellular system, and so on, have conventionally been used in order to transmit a paging message. In such a transmission system, a paging message for an incoming call to a mobile station in which power consumption has been reduced is received only by a predetermined slot for an incoming call therein, which results in so-called intermittent receiving. For this reason, it was necessary to transmit a particular paging slot for an incoming call with the timing of a paging message received while the mobile station was on standby. On the other hand, in a mobile station in which no reduction in power consumption was necessary, such as an on-vehicle mobile station, since all paging slots were received, a paging message was transmitted from a radio base station without using any particular paging slots.

In the conventional transmission system, when a paging message was received by the paging slot received by the mobile station, determination was made as to whether the message was for a call incoming to the present station or for a call incoming to another station based on the mobile station number contained in the paging message. If the paging message was discovered to be for the present station, then intermittent receiving was stopped and calling was carried out based on a call connecting procedure for call connection in order to be engaged in communication with the mobile station as a caller side. If the paging message is from another station, intermittent receiving can be maintained.

Next, an example of using a personal digital cellular communication system will be described. Referring to FIG. 5, there is shown a constitutional example of a common control channel which is transmitted from the radio base station of such a cellular communication system. A common control channel 500 transmitted from the radio base station (not shown in the drawing) time-division multiplexes a reporting channel 510 for carrying information to be reported, incoming call channels 520-1 to 520-3 for carrying paging messages, and individual cell control channels 530-1 to 530-4 for carrying call connection messages on the same frequency. Each of the channels for an incoming call is composed of a plurality of groups of slots for an incoming call so as to reduce the power consumption of the mobile station. For the division of the channels for an incoming call into groups, reference may be made to pp. 2 to 350 of the separate volume of the lecture papers of Electronic Information Communication Academy Spring National Convention held in March, 1990.

In such a communication system, upon having received information for an incoming call from the control station, the radio base station determines whether the information for the incoming call is for an intermittent receiving mobile station or a non-intermittent receiving mobile station. If the information is discovered to be for the intermittent receiving mobile station, the radio base station selects a paging slot to which the mobile station belongs. If the information is for the non-intermittent receiving mobile station, the base station selects a slot having the smaller number of paging messages on standby from a plurality of slots for incoming calls and transmits the messages for incoming call. On the other hand, during the standby period, the intermittent mobile station receives the paging slot to itself, the non-intermittent receiving mobile station receives all the paging slots and thereby all the paging messages can be received.

However, with the conventional transmission system, since a paging message transmission priority order was decided according to intermittent receiving cycles, the transmission of a paging message to the mobile station having a long intermittent receiving cycle was high in the priority order. Accordingly, when traffic was increased in the channel for an incoming call, a paging message for the mobile station having a short intermittent receiving cycle was not transmitted from the radio base station and it was impossible to call the terminal device having a short intermittent receiving cycle at all, which resulted in a reduction in transmission efficiency.

SUMMARY OF THE INVENTION

An object of the present invention is to solve the above-mentioned problems.

Another object of the present invention is to enable calling of a mobile station having a short intermittent receiving cycle by providing an equal opportunity for transmission through a channel for an incoming call irrespective of the intermittent receiving cycle of the mobile station even when traffic is increased in the channel for the incoming call.

Another object of the present invention is to make uniform the call responding time of a caller without any dependence on the intermittent receiving cycle of a mobile station to be called even when traffic is increased in a channel for an incoming call.

Yet another purpose of the present invention is to improve transmission efficiency by making uniform the incoming call responding time of a caller.

According to the system and the method for transmitting paging messages, which is provided by the present invention as a means to solve the above-discussed tasks, in a mobile communication system in which cycles for receiving incoming call channels are different among mobile stations, when a mobile station is to be called by a terminal device in a caller side, incoming call information containing the intermittent receiving cycle of the mobile station and a mobile station number is sent from a radio base station to a control station, a paging slot received by the mobile station is obtained from the mobile station number and the intermittent receiving cycle contained in the incoming call information received by the control station and then this slot is written in a buffer corresponding to the obtained paging slot.

When a timing is one for a certain paging slot, all mobile station incoming call information stored in the buffers of corresponding paging slots are read, a transmission priority order for these mobile station incoming call information is decided based on intermittent receiving cycles and holding numbers and starting from mobile incoming call information highest in the transmission priority order, the bits of information are packed in a paging message which is transmitted with the above-noted timing.

As a result, according to the paging message transmitting means, products between the intermittent receiving cycles and the holding numbers of all the bits of mobile station incoming call information read from the buffers of the corresponding slots for incoming calls are calculated for respective slots for incoming an call, a transmission priority order is decided based on the calculated products and thereby the bits of mobile station incoming call information can be packed in a paging message starting from the mobile station incoming call information high in the priority order.

BRIEF DESCRIPTION OF THE DRAWINGS

These and other objects, features and advantages of the present invention will become more apparent upon a reading of the following detailed description and drawings, in which.

DESCRIPTION OF THE EMBODIMENTS

Figure 1:
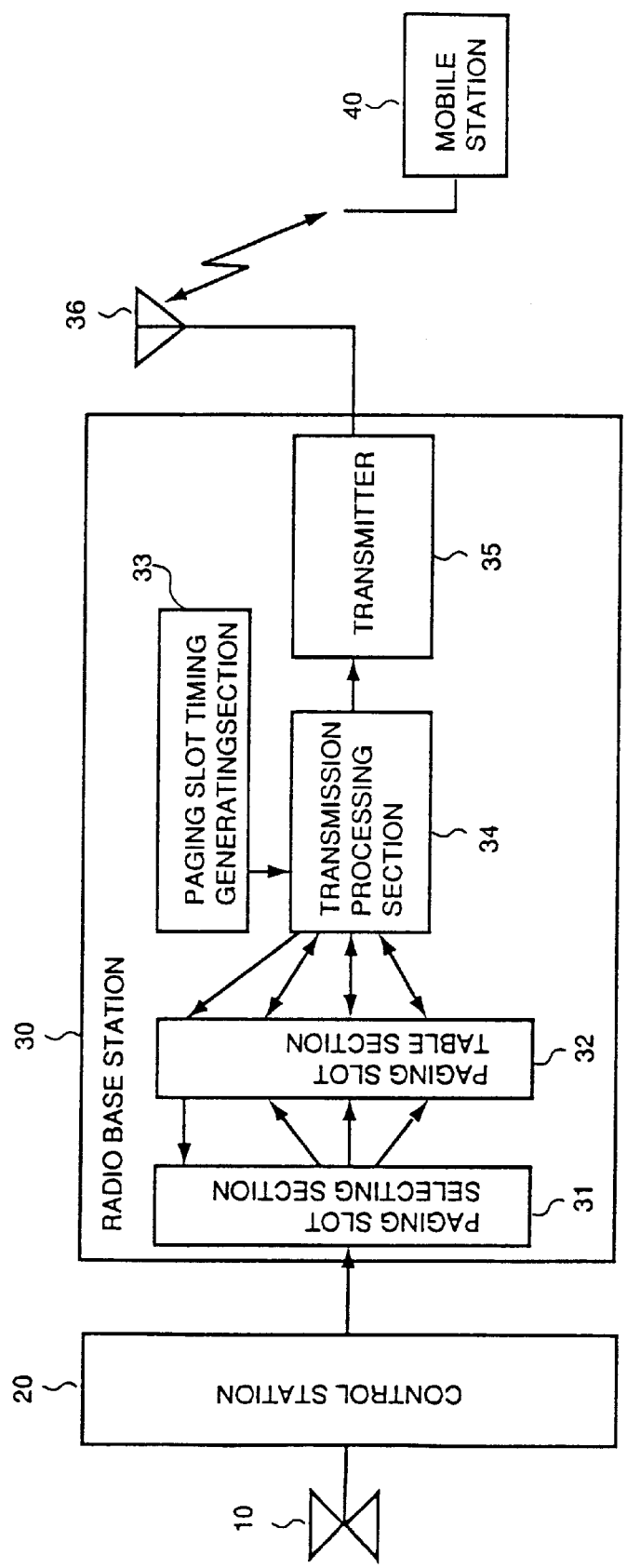
FIG. 1 is a block diagram showing constitutions of a paging message transmission system and a paging message transmission method of an embodiment of the present invention.

The system and the method for transmitting a paging message for an incoming call (referred to as paging message, hereinafter) of the preferred embodiment of the present invention will be described in detail with reference to the accompanying drawings. FIG. 1 is a block diagram showing the constitution of the transmission system of an embodiment of the present invention.

Referring to FIG. 1, which illustrates the transmission system, the cycles of receiving channels for an incoming call are different among mobile stations in the mobile communication system. A fixed terminal device 10 is connected to a radio base station 30 through a control station 20. The radio base station 30 communicates with a mobile station 40 by a radio signal.

In FIG. 1, when calling the mobile station 40, the control station 20 sends incoming call information containing the intermittent receiving cycle of the mobile station 40 and a mobile station number of the mobile station 40 to the radio base station 30. The mobile station number is a number allocated to each mobile station. The radio base station 30 obtains a paging slot that the mobile station 40 is monitoring for receiving a paging message based on the mobile station number and the intermittent receiving cycle contained in the received incoming call information. When timing for a paging slot of the mobile station 40 is realized, a paging message is transmitted to the mobile station 40 via a transmitter 35 and an antenna 36.

The radio base station 30 comprises a paging slot selecting section 31, a paging slot table section 32, a paging slot timing generating section 33, a transmission processing section 34 and a transmitter 35 for transmitting the paging message via the antenna 36 to the mobile station 40.

The paging slot selecting section 31 calculates a paging slot number of the mobile station 40 to be called based on the mobile station number and the intermittent receiving cycle contained in the received incoming call information from the control station 20. Then, the paging slot selecting section 31 writes a mobile station incoming call information to a buffer of the paging slot table section 32 corresponding to the calculated paging slot number. One buffer corresponding to a paging slot number can hold a plurality of pieces of mobile station incoming call information. The mobile station incoming call information is obtained by adding a holding number to the incoming call information received from the control station 20.

The paging slot timing generating section 33 includes a counter for counting a paging slot number to be processed by the transmission processing section 34. The counter increments its count by one for each length of a paging slot and is reset at the maximum value of an intermittent receiving cycle. For example, if the length of one paging slot is 80 msec., and the maximum value of an intermittent receiving cycle is 32 slots (2.56 sec), a counted value is incremented by 1 for each period of 80 msec., and a next counted value from a counted value 32 is set to 1. Buffers corresponding to paging slot numbers of 32 kinds are prepared in the paging slot table section 32.

The transmission processing section 34 reads all the mobile station incoming call information stored in the buffer corresponding to the paging slot number as the counted value reported from the paging slot timing generating section 33. Also, the transmission processing section 34 calculates a product between an intermittent receiving cycle and a holding number. The transmission processing section 34 increases the priority of mobile station incoming call information for a large product. The mobile station numbers contained in the mobile station incoming call information are packed in the paging message according to the priority order.

A plurality of mobile station numbers can be packed in one message. After packing of one paging message has been finished, the packed paging message is transmitted to the transmitter 35.

In the transmission processing section 34, the holding number of the mobile station incoming call information corresponding to mobile station number unpacked in the paging message is added to 1. The added mobile station incoming call information can be written again in the buffer corresponding to a paging slot number. The slot number is obtained by adding an intermittent receiving cycle predetermined for each mobile station to the processed paging slot number.

Figure 2:
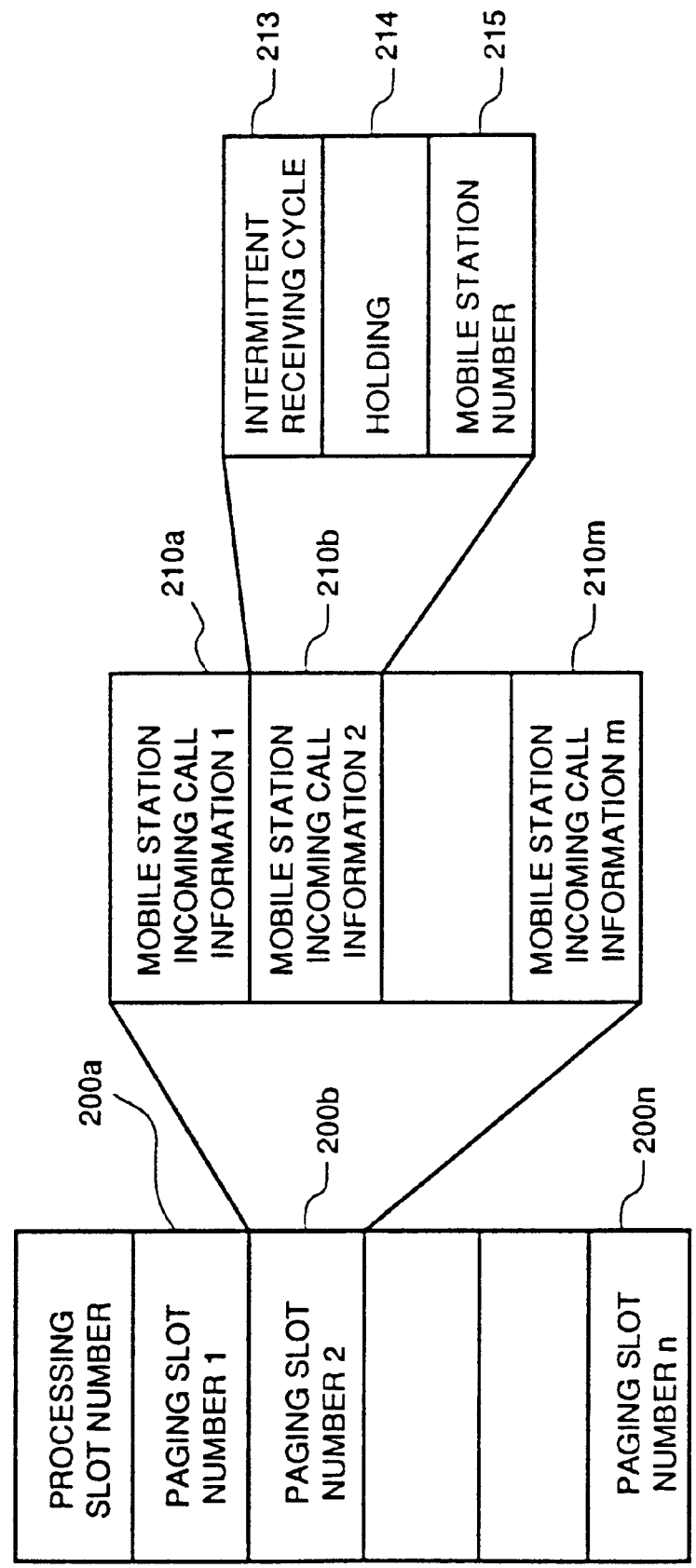
FIG. 2 is a view showing a constitution of a paging slot table section 32 of the paging message transmission system shown in FIG. 1.

FIG. 2 illustrates elements for the paging slot table section 32 shown in FIG. 1. The paging slot table section 32 has buffers of the same numbers of the paging slots having maximum intermittent receiving cycles in the system. A plurality pieces of mobile station incoming call information are respectively stored in buffers 200a to 200n corresponding to paging slot numbers a to n. For example, in a buffer 200b corresponding to a paging slot number 2, there are provided buffers 210a to 210m for storing the numbers 1 to m of pieces of mobile station incoming call information. The buffers 210a to 210m store a mobile station number 215, the intermittent receiving cycle 213 of this mobile station and the holding number 214 of the mobile station incoming call information.

The holding number indicates the number of times of writing in the paging slot table section 32. When incoming call information is received from the control station 20, the paging slot selecting section 31 sets the holding number to 1.

In the paging slot table section 32, a minimum value of a paging slot number is obtained based on the mobile station number. Specifically, this is used in a standard terminal interface adapter (TIA) and also can be applied to the mobile communication system for obtaining the slot number of the mobile station 40 by adding (maximum intermittent receiving cycle) +1 to (mobile station number). In this case, a paging slot number that the mobile station 40 is receiving can be obtained based on (minimum slot number)+ (intermittent receiving cycle) ×n (n=0, 1, 2, . . . ).

Accordingly, since paging slots that mobile station numbers are receiving are different depending on mobile station numbers, a load placed on the incoming call channel can be dispersed. The intermittent receiving cycle is a cycle for the paging slot received by the mobile station. For example, in the mobile station 40 having an intermittent receiving cycle of 4, a paging slot is received for every 4 slots by the mobile station 40.

The transmission processing section 34 issues a writing instruction to the paging slot table section 32 when traffic is increased in the incoming call channel and it is discovered that packing into the paging message failed. At this time, the paging slot table section 32 adds 1 to the holding number in order to move up a position in the transmission priority order during packing the next time.

The operation of the paging message transmission system of the embodiment will now be described by referring to FIGS. 3 and 4. For the description of the operation, reference will be made to FIGS. 1 and 2.

When the mobile station 40 is called from the fixed terminal station 10, incoming call information containing the intermittent receiving cycle of the mobile station 40 and a mobile station number is sent from the control station 20 to the paging slot selecting section 31.

Figure 3:
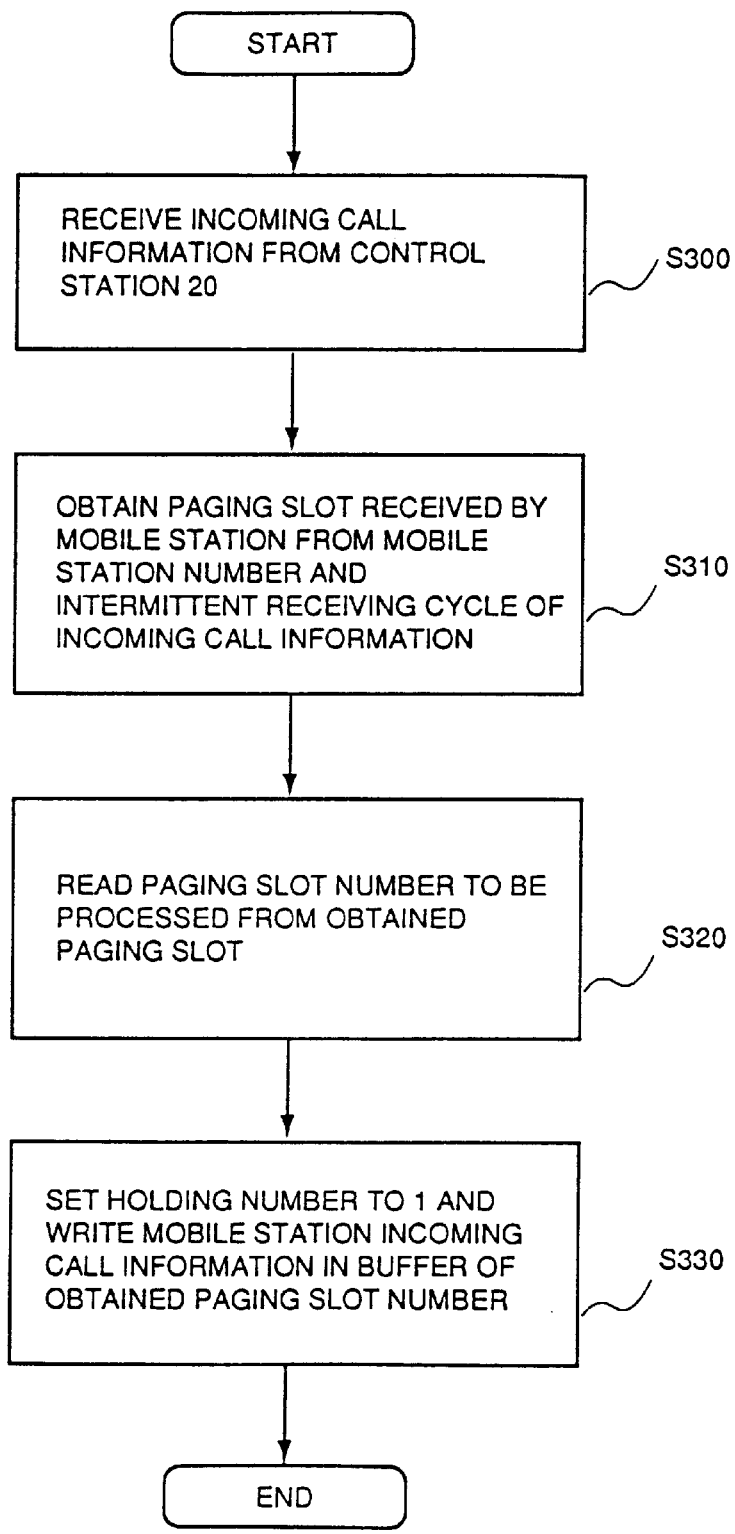
FIG. 3 is a flowchart illustrating operations of a transmission processing section 34 shown in FIG. 1.

FIG. 3 is a flowchart illustrating an operation performed in the paging slot selecting section 31. In the description made below by using the flowchart, step 300 will be referred to as S300.

In S300, incoming call information is received from the control station 20. Then, in S310, a paging slot that the mobile station 40 is receiving is obtained based on the mobile station number and the intermittent receiving cycle contained in the incoming call information.

In S320, a paging slot number to be processed is read from the paging slot table section 32 based on the paging slot.

In S330, a holding number of the mobile station incoming call information is set to 1, the mobile station incoming call information is written in the buffer of the read paging slot number. The process is now finished. Thus, in the paging slot selecting section 31, the paging slot number can be quickly performed.

Figure 4:
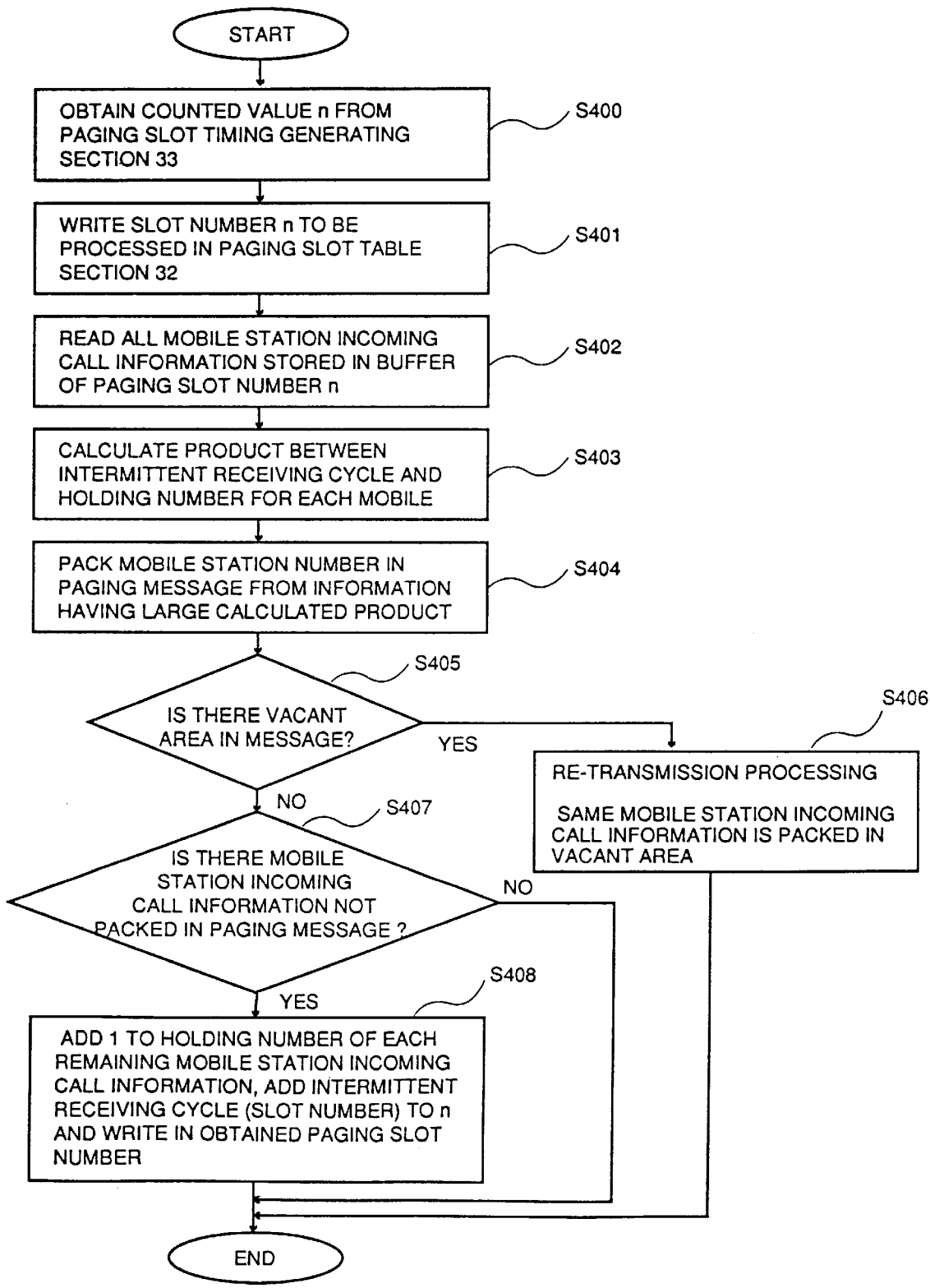
FIG. 4 is a flowchart illustrating operations of a paging slot timing generating section 33 and a paging slot table section 32 shown in FIG. 1.
Figure 5:
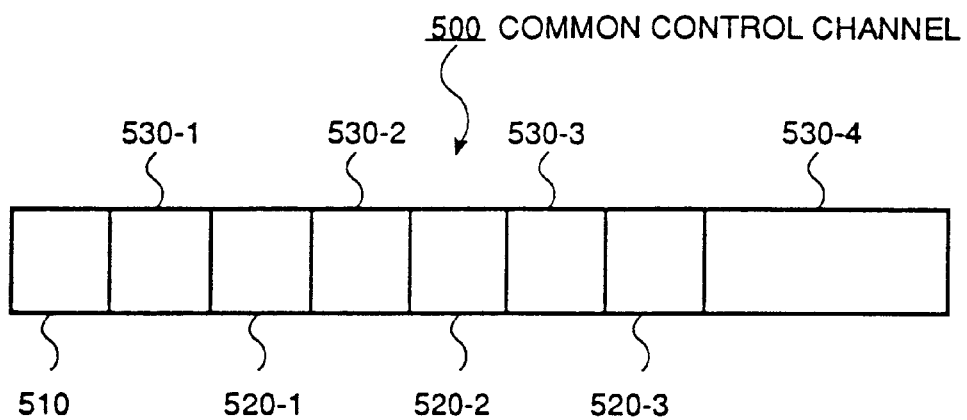
FIG. 5 is view showing a constitutional example of a common control channel transmitted from a radio base station of a conventional communication system.

FIG. 4 is a flowchart illustrating an operation performed in the transmission processing section 34. For the description of this process flowing, reference will also be made to FIGS. 1 and 2.

In S400, a counted value n is obtained from the paging slot timing generating section 33. In S401, the obtained counted value is written in the table writing area of the incoming call slot table section 32 as a processing paging slot number.

In S402, all mobile station incoming call information stored in the buffer corresponding to the paging slot number n is read. After all mobile station incoming call information have been read, in S403, a product between an intermittent receiving cycle and a holding number be can calculated for each mobile station incoming call information.

Then, in S404, the mobile station numbers are packed in a paging message starting from the information having a large product between the intermittent receiving cycle and the holding number for each mobile station incoming call information.

In S405, determination is made as to the existence of a vacant area in the paging message. If a vacant area exists in the paging message (YES in S405), the process proceeds to S406. In S406, re-transmission processing is performed, the same mobile station number is packed in the vacant area and the process is finished. In other words, if there is a vacant area in the paging message, in order to increase the probability of receiving by the mobile station 40, the mobile station number that has been packed once is packed again. When no more vacant areas exist in the paging message, the process is finished.

If no vacant areas are found to exist in the paging message (NO in S405), the process proceeds to S407. Then a determination is made as to all mobile station numbers are packed in the paging message or not.

If all mobile station numbers are not packed in the paging message (YES in S407), 1 is added to the holding number of each remaining mobile station incoming call information. An intermittent receiving cycle of the remaining mobile station incoming call information is added to an integer n. The added information is written in the buffer of the calculated paging slot number (New paging slot number). Then, the process is finished.

If all mobile station incoming call information is packed in the paging message (NO in S407), then the process is immediately finished.

Next, the specific operations of the paging message transmission system and the paging message transmission method of the embodiment of the present invention will be described by referring to FIGS. 1 to 4.

The maximum value of an intermittent receiving cycle as a parameter for the mobile communication system is set to 32 slots. For the intermittent receiving cycles of other kinds, 1, 2, 4, 8 and 16 slots are respectively prepared.

Therefore, the paging slot numbers of the paging slot table section 32 are the maximum value of 32 slots. In the embodiment, when the mobile station 40 of a mobile station number (e.g. 123456) and an intermittent receiving cycle (8 slots) is to be called from the fixed terminal station 10, incoming call information containing the intermittent receiving cycle (8 slots) and the mobile station number (123456) is sent from the control station 20 to the paging slot selecting section 31.

In S310, the paging slot selecting section 31 calculates a paging slot based on the intermittent receiving cycle (8 slots) and the mobile station number (123456).

In the mobile communication system for calculating a paging slot by adding (maximum intermittent receiving cycle)+1 to (mobile station number), which is used in a standard terminal interface adapter (TIA), a remainder obtained by dividing the mobile station number by the maximum value of the intermittent receiving cycle is 1 (=123456 modulo 32+1). Accordingly, since paging slots is 1+8×m (m=0,1, 2 and 3, Intermittent receiving cycles=8), paging slots to be obtained are 1, 9, 17 and 25.

Then, in S320, a processed slot number indicating a paging slot number being processed by the transmission processing section 34 is read from the paging slot table 32. If this read value is 15 slots, in other words if the paging slot number being processed by the transmission processing section 34 is 15 slots, for a most appropriate paging slot number, 17 slots which allows the transmission processing section 34 to perform fastest processing are selected in order to shorten the standby period of a caller side.

Then, in S330, by setting a holding number to 1, the mobile station incoming call information is written in a buffer corresponding to the paging slot number 17 obtained in S320.

In S400, the transmission processing section 34 obtains a counted value from the paging slot timing generating section 33. When the obtained counted value is 17 slots, the transmission processing section 34 reads all the mobile station incoming call information stored in the buffer corresponding to the paging slot number 17(counted value).

The mobile station incoming call information of mobile station 40 is included in the read mobile station incoming call information. Then number 17 is written in the paging slot table 32 as the processed slot number.

Then, in S403, a product between an intermittent receiving cycle and a holding number is calculated for each read mobile station incoming call information. Proceeding to S404, the mobile station incoming call information are packed in a paging message in sequence starting from the information having a largest product.

This packing is finished when it is confirmed that there are no more mobile station incoming call information or that there are no more vacant areas in the paging message.

After the completion of the packing, in S406, determination is made as to the existence of any vacant areas in the paging message.

If mobile station incoming call information having the mobile station number (123456), the intermittent receiving cycle (8 slots) and the holding number (1) is included in the information which has been read, a product between the intermittent receiving cycle and the holding number is 8.

If a product between the intermittent receiving cycle and the holding number of another mobile station incoming call information is larger than 8, the mobile station number (123456) is lower in the transmission priority order.

The mobile station number is packed in a paging message from the information highest in the transmission priority order. If no more vacant areas are determined to exist in the paging message and there is remaining mobile station incoming call information, the remaining mobile station incoming call information can be written again in the paging slot table section 32.

For example, when the mobile station incoming call information having the mobile station number (123456), the intermittent receiving cycle (8 slots) and the holding number (1) is to be written in the paging slot table section 32, the holding number is set to 2 by adding 1 to the number and the mobile station incoming call information is renewed. The renewed information is written in the buffer corresponding to a paging slot number (25 slots) obtained by adding the intermittent receiving cycle (8 slots) to the slot of the incoming call slot number 17 currently being processed by the transmission processing section 34.

The mobile station incoming call information containing this mobile station number (123456) is read again from the paging slot table section 32 by the transmission processing section 34 and this information is compared with the other bits of mobile station incoming call information for a transmission priority order when a counted value reported from the incoming call slot timing generating section 33 becomes 25 slots. At this time, if the information is higher than the other bits of mobile station incoming call information in the transmission priority order, then the information is packed in the paging message and transmitted to the mobile station 40.

According to the embodiment, when a mobile station is to be called by the terminal station as a caller side, incoming call information containing the intermittent receiving cycle and the number of the mobile station is sent from the radio base station to the control station. A paging slot received by the mobile station is obtained from the mobile station number and the intermittent receiving cycle contained in the incoming call information received from the control station and then the incoming call information can be written in the writing means of the buffer corresponding to the obtained incoming call slot.

When a timing is one for a certain paging slot, all the mobile station incoming call information stored in the buffer corresponding to the paging slot are read out of the buffer. A transmission priority order among the bits of mobile station incoming call information is decided based on intermittent receiving cycles and holding numbers and these bits of mobile station incoming call information can be packed in sequence in a paging message for an incoming call to be transmitted with the above-noted timing starting from the information high in the transmission priority order.

Thus, in the paging message transmitting means, products are calculated between the intermittent receiving cycles and the holding numbers of all the mobile station incoming call information each read from the buffer of the paging slot number for each paging slot. A transmission priority order is decided based on the calculated products and these bits of mobile station incoming call information can be packed in the paging message starting from the information high in the priority order.

According to the embodiment, a paging message for an incoming call is transmitted to the mobile station and information is packed in the paging message. If there is a mobile station number left unpacked, a holding number is changed so as to increase its position in the transmission priority order when packing is performed in the next timing. More particularly, if there is a mobile station incoming call information left unpacked in the paging message, a holding number changing section writes this information again in the buffer of a corresponding paging slot number by adding 1 to the holding number of each mobile station incoming call information so as to increase its position in the transmission priority order the next time packing is performed. The paging slot number used for rewriting of information can be obtained by adding an intermittent receiving cycle predetermined for each mobile station to a currently processed paging slot number.

When information is to be packed in a paging message, if there is a vacant area remaining in the paging message after all bits of a mobile station incoming call information have been read, in order to increase the probability of receipt by the mobile station, the mobile station incoming call information which has been packed once is packed again in the remaining vacant area. By this re-packing, when information is to be packed in the paging message of a certain timing, all the bits of mobile station incoming call information read from the buffer of a paging slot for an incoming call number to be transmitted with the timing can be packed. Accordingly, if there is a vacant area remaining in the paging message after the packing, in order to increase the probability of receiving by the mobile station, the mobile station incoming call information packed once can be packed again in the remaining vacant area.

As described above, with the paging message transmission system and the paging message transmission method of the present invention, when a timing is one for a paging slot for an incoming call for calling the mobile station, information is transmitted with this timing and packed in a paging message for an incoming call with a timing for mobile station incoming call information. By transmitting the paging message to the mobile station via the antenna, if a holding number is the same, mobile station incoming call information having a long intermittent receiving cycle can be placed high in a transmission priority order and if an intermittent receiving cycle is the same, mobile station incoming call information having a large holding number can be placed high in the transmission priority order. Consequently, in the mobile communication system in which cycles for receiving incoming call channels are different among mobile stations, when the mobile station is to be called from the terminal device as a caller side, the incoming call responding time of a calling side can be made uniform irrespective of the intermittent receiving cycle of the mobile station.

According to the present invention, when information is to be packed in a paging message for an incoming call, if there is a mobile station incoming call number left unpacked, by increasing the number of holding times and heightening the position of this unpacked mobile station incoming call number when packing is performed in a next paging message, the incoming call responding time of a calling side can be made uniform irrespective of the intermittent receiving cycle of the mobile station when the mobile station is to be called from the terminal device as a caller side.

Furthermore, according to the present invention, when information is to be packed in a paging message for an incoming call, if there is a vacant area remaining in the paging message after all bits of mobile station incoming call information to be sent with this paging message have been packed, since the mobile station side incoming call information packed once is packed again in the remaining vacant area, the paging message receiving probability of the mobile station can be increased.

The entire disclosure of Japanese Patent Application No. 8-209547 filed on Aug. 8, 1996 including specification, claims, drawing and summary are incorporated herein by reference in its entirety.

What is claimed is:

1. A paging message transmission system in a mobile communication system having a control station which calls mobile stations from a caller terminal device and performs mobile communication while designating paging slots having a different respective cycle for each of said mobile stations, said paging message transmission system comprising:

a receiver which receives a mobile station number and intermittent receiving cycle information from incoming call information received from said control station when said mobile station is to be called from said terminal device;

paging slot selector which calculates a paging slot for an incoming call based on said mobile station number and said intermittent receiving cycle information;

a buffer which stores a mobile station incoming call information element having said mobile station number, said intermittent receiving cycle information and a holding number in an area corresponding to said paging slot; and a transmission processor which reads said mobile station incoming call information element from said buffer, decides a transmission priority order for said mobile station number based on said intermittent receiving cycle information and said holding number; and packs said mobile station number in a paging message according to said transmission priority;

wherein said holding number indicates how long a respective mobile station number has been stored in said buffer and not packed in said paging message.

2. The paging message transmission system as claimed in claim 1, wherein said transmission processor packs said mobile station number again in a remaining vacant area of said paging message when said vacant area still exists in said paging message after said transmission processor has finished packing all of said mobile station numbers in said paging message.

3. The paging message transmission system as claimed in claim 1, wherein said transmission processor changes said holding number contained in said mobile station incoming call information for a respective mobile station number which was not packed in said paging message and records a result of said changing in a portion of said buffer corresponding to said paging slot.

4. The paging message transmission system as claimed in claim 3, wherein said transmission processor packs said mobile station number again in a remaining vacant area of said paging message when said vacant area still exists in said paging message after said transmission processor is finished packing of said mobile station numbers in said paging message.

5. A paging message transmission system in a mobile communication system for calling mobile stations from a caller terminal device and for performing mobile communication while designating paging slots having a different respective cycle for each of said mobile stations, said paging message transmission system comprising:

a control station which generates incoming call information including mobile station numbers of said mobile stations and intermittent receiving cycles of said mobile stations when said mobile stations are called from said caller terminal device;

a plurality of buffers corresponding to paging slots, said buffers being designed for storing mobile station incoming call information including said incoming call information and holding number information;

a memory which stores a slot number being currently processed;

a paging slot selector which calculates a paging slot to be processed next among said paging slots of said mobile stations based on said processed slot number and said incoming call information;

a transmission processor which generates said mobile station incoming call information by adding a holding number to said incoming call information and stores said mobile station incoming call information in one of said buffers corresponding to said paging slot;

said transmission processor further reads said mobile station incoming call information stored in said buffer corresponding to said paging slot and calculates products between holding numbers of said mobile station incoming call information and said intermittent receiving cycles; and said transmission processor further packs said mobile station numbers included in said mobile station incoming call information in a paging message in a sequence starting from a largest one of said products;

wherein said holding number information indicates how long a respective one of said mobile station numbers has been stored in one of said buffers and not packed in said paging message.

6. The paging message transmission system as claimed in claim 5, wherein said transmission processor further packs said mobile station numbers again in a remaining vacant area of said paging message when said vacant area still exists in said paging message after said transmission processor is finished packing of all of said mobile station numbers in said paging message.

7. The paging message transmission system as claimed in claim 5, wherein said transmission processor further renews said mobile station incoming call information, thereby creating a renewed mobile station incoming call information, by adding 1 to said holding number of said mobile station incoming call information relating to a mobile station number unpacked in said paging message and stores said renewed mobile station incoming call information in one of said buffers corresponding to a paging slot to be processed next among said mobile station paging slots.

8. The paging message transmission system as claimed in claim 5, further comprising a counter for counting a slot number, said counter being reset when a slot number corresponding to a largest intermittent receiving cycle is counted, a value of said counter being stored in said memory.

9. A method of calling mobile stations from a caller terminal device through a control station and for performing mobile communication while designating paging slots having a different respective cycle for each of said mobile stations, said method comprising the acts of:

receiving a mobile station number and a paging slot for an incoming call from incoming call information received from said control station when said mobile station is to be called from said terminal device;

storing a mobile station incoming call information element having said mobile station number, an intermittent receiving cycle information, and holding number information, in a buffer corresponding to said paging slot;

reading said mobile station incoming call information from said buffer;

deciding a transmission priority order for said mobile station incoming call information based on said intermittent receiving cycle information and said holding number information; and packing said mobile station number in a paging message according to said transmission order;

wherein said holding number information indicates how long a respective one of said mobile station numbers has been stored in said buffer and not packed in said paging message.

10. The method as claimed in claim 9, further comprising the acts of:

packing mobile station numbers relating to all of said mobile stations in said paging message thereby creating packed mobile station incoming call information, and packing portions of said packed mobile station incoming call information again in a remaining vacant area of said paging message when said vacant area still exists in said paging message.

11. The method as claimed in claim 9, further comprising the acts of:

changing said holding number information contained in said mobile station incoming call information which corresponds to mobile stations numbers that were not packed in said paging message, and storing said holding number information again in a portion of said buffer corresponding to said paging slot.

12. The method as claimed in claim 11, further comprising the acts of:

packing mobile station incoming call information regarding all of said mobile stations in said paging message, thereby producing a packed mobile station incoming call information; and packing portions of said packed mobile station incoming call information again in a remaining vacant area of said paging message when said vacant area still exists in said paging message.

13. A method for calling mobile stations from a caller terminal device and for performing mobile communication while designating paging slots having a different respective cycle for each of said mobile stations, said method comprising the acts of:

receiving information from said caller terminal device which is to be sent to said mobile stations;

storing said information in a buffer;

calculating products between holding numbers and intermittent receiving cycles of said mobile stations; and packing mobile station numbers that can fit into in a paging message in a sequence starting from a mobile station number of a mobile station having a largest product among said calculated products;

wherein said holding numbers indicate how long a mobile station number has been stored in said buffer and not packed in said paging message.

14. The method as claimed in claim 13, further comprising the act of adding 1 to a respective holding number for each mobile station number for which said packing was not performed.

15. The method as claimed in claim 13, further comprising the act of packing said mobile station numbers again in said paging message in a sequence starting with the mobile station number of said mobile station having a largest product, when a vacant area still exists in said paging message after said mobile station numbers are packed in said paging message.

* * * * *